Oct. 6, 1942.	F. F. EHRENHAFT	2,298,045
OPTICAL COMPENSATING DEVICE
Filed Jan. 31, 1940	2 Sheets-Sheet 1
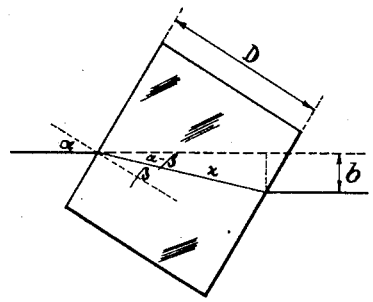
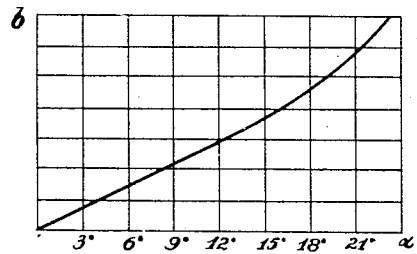
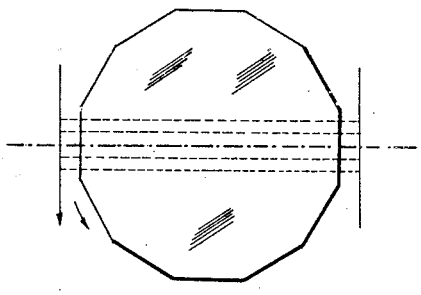
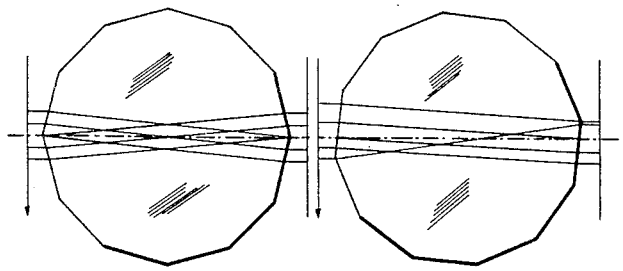
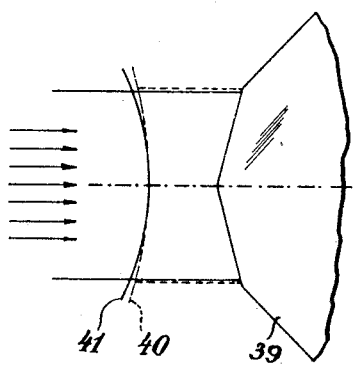
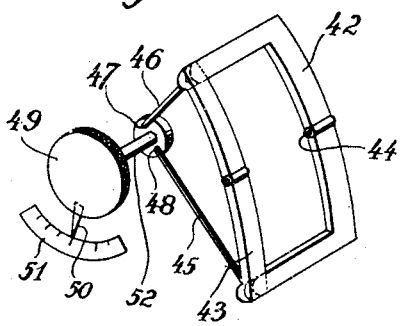
INVENTOR:
Franz F. Ehrenhaft Oct. 6, 1942.  F. F. EHRENHAFT  2,298,045
OPTICAL COMPENSATING DEVICE
Filed Jan. 31, 1940  2 Sheets-Sheet 2
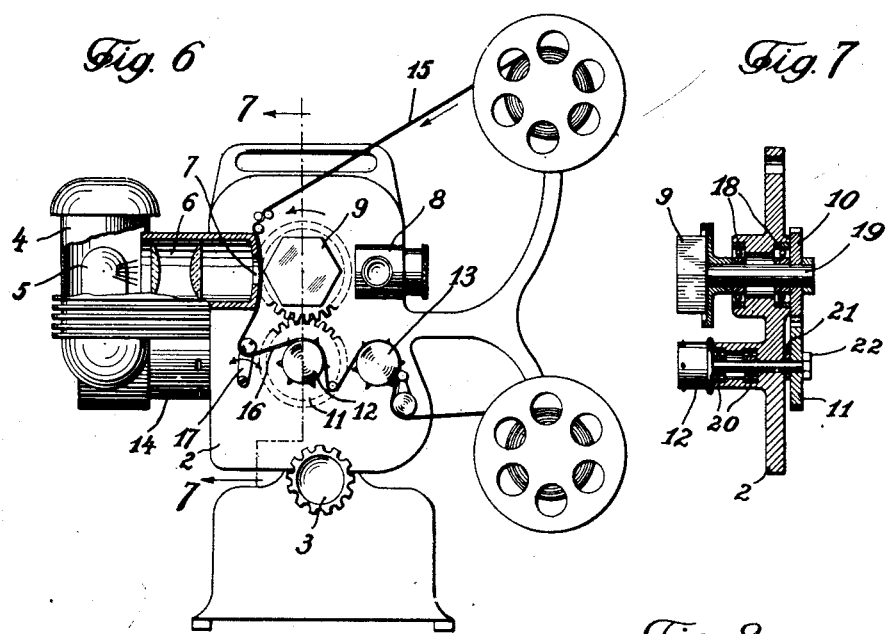
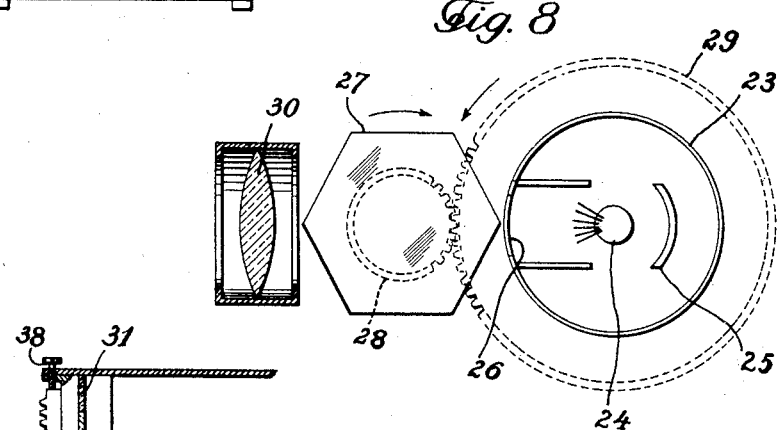
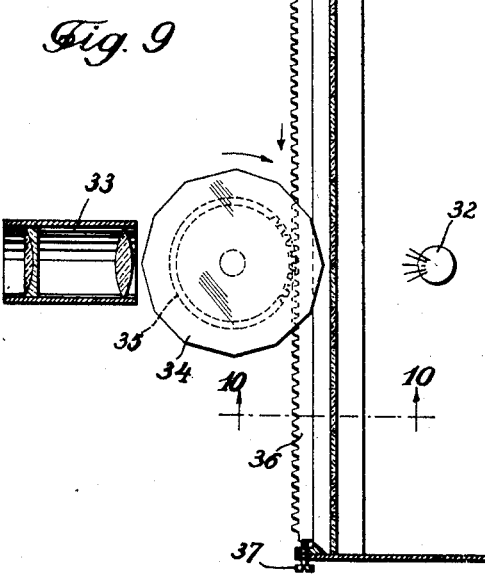
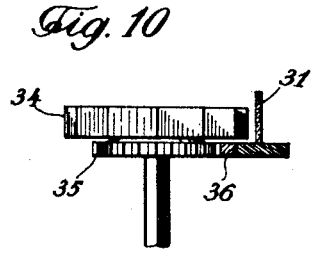
INVENTOR.
Franz F. Ehrenhaft Patented Oct. 6, 1942

2,298,045

UNITED STATES PATENT OFFICE 2,298,045

OPTICAL COMPENSATING DEVICE

Franz F. Ehrenhaft, New York, N. Y.

Application January 31, 1940, Serial No. 316,488

4 Claims. (Cl. 88—16.8)

My invention relates to a cinematographic projector with means for moving a picture carrier continuously with uniform speed and a polygonal refracting prism placed between this picture carrier and the projection lens in order to obtain a steady image on a suitable screen.

Projectors of this type appear to be very simple and reliable in use, and are especially adapted for synchronous sound reproduction. Their perfection and efficiency depends, of course, upon success in eliminating optical errors caused by the refracting prism or at least upon minimizing such errors to a degree where they do not further influence the projection.

It is therefore the main object of my present invention to eliminate optical errors caused by the refracting prism and the continuously moving picture carrier as far as possible.

It is a further object of my invention to adjust the relative position of the picture carrier moving past the exposure aperture and the prism in order to eliminate these optical errors.

Still a further object of my invention is to provide for this purpose regulating means for adjusting the relative position of the dividing lines on the picture carrier moving past the aperture, the prism and the optical axis of the projector in such a way, that each of the dividing lines is passing the optical axis simultaneously with two of the prism edges. This has the effect that each picture on the picture carrier is in the centre of the exposure aperture at the instant in which the prism presents a pair of its faces in exact parallelism with the plane of the picture carrier in the exposure aperture so as to properly "frame" the picture upon the screen.

It is still a further object of my invention to provide these adjusting means in such a way as to enable adjustment during the operation of the apparatus so that any departure during operation from the desired condition may be immediately corrected when first perceived.

Adjusting means of the type proposed by me are adapted for "framing" of the picture but they are insufficient to compensate for distortion of the projection caused by use of shrunken or stretched film. As it is impossible to avoid use of such film material this important problem has to be considered seriously. The reduction of the length of the film can be compensated by the adjusting means proposed by me but in a projector where the size of the film frame influences the whole optical arrangement, particularly the dimensions of the prism, the compensation of the length of the film is not sufficient.

The frame of the shrunken film has a smaller vertical size as considered for the calculation of the prism and therefore a serious confusion of the projected image may be caused.

It is therefore still a further object of my invention to avoid optical errors in the projection caused by shrinkage of the projected film.

In order to attain this object I propose to provide in a cinematographic projector in combination with a compensating refracting prism curved film guiding means provided with an exposure aperture, and means for adjusting the curvature of the guiding surface of the guiding means, enabling thereby adjustment of the exposure aperture and compensation for variations in film size.

Guiding the film in a curve causes the dislocation of the frame with respect to the optical system and incorrect definition is the consequence. According to my observations this can be avoided by using projection lenses with a higher depth of field. I propose therefore to provide for a slit limiting the vertical aperture of the lens as stop for the projection lens. By provision of such a slit the required higher depth of field of the projection lens may be achieved; simultaneously the size of astigmatic errors is materially reduced.

A further advantage in connection with the use of this slit is the following one: Projecting a film on a screen one sees a central image on the optical axis and secondary images thereabove and therebelow caused by the other prism faces out of action. These disturbing secondary images have to be screened out. The necessary diaphragm should be arranged as distant as possible from the projection lenses. The smaller the vertical aperture of the lens the more effective is the diaphragm.

By providing the adjusting means and the curved guiding means proposed by me most of the optical errors caused by the refracting prism and the movement of the film carrier may be eliminated, provided that the steadiness of the film frames in relation to the prism faces is perfect. Any difference in this relation causes confusion on the screen.

It is therefore a further very important object of my invention to prevent dislocation of the prism faces with respect to the film faces during the rotation of the prism. In order to attain this most important object I propose means in combination with the adjusting means and the curved guiding means proposed by me, the provision of rotating means, driven by the picture carrier itself and adapted to drive the prism. In this way any possibility of dislocation of the prism faces with respect to the film frames during operation of the projector will be eliminated.

The characteristic features and advantages of my improvements will further appear from the following description and the accompanying drawings illustrating preferred embodiments of my invention. In the drawings:

Figure 1 is a view of a plane-parallel glass plate penetrated by a light ray,

Figure 2 is a diagram showing the function of the relation between the angle of incidence and the displacement of a light ray caused by the glass plate shown in Fig. 1, Figures 3–5 are diagrammatic elevations illustrating the direction taken by the projected light in passing through the refracting prism of the projector, Figure 6 is a side elevation of a motion picture projector embodying my invention, Figure 7 is a section of the adjusting means in accordance with my invention along line 7—7 of Fig. 6, Figure 8 is a somewhat diagrammatic view of a projector using a cylindrical picture carrier, Figure 9 is a diagrammatic view of a projector in which the prism is driven by a toothed rack, Figure 10 is a partial cross section of the projector shown in Fig. 9.

Figure 11 is a diagrammatic view of film guiding means embodying my invention, and Figure 12 is a perspective view of the guiding means diagrammatically shown in Fig. 11.

As set forth above the perfection and efficiency of projectors with optical compensating means depends upon the right dimensions and correct relative position of the optical compensating means, for instance the refracting prism, and the film carrier itself. Basic optical laws prescribe dimensions of the rotating prism as well as its optical correct placement with respect to the projector construction. The latter in turn depends upon the size of the film frame and upon the material of the prism.

To understand the optical conditions for the projection we see in Fig. 1 a plane-parallel glass plate penetrated by a light ray. This light ray enters the plate at the angle of incidence $\alpha$, passes in the plate at the angle of refraction $\beta$ and emerges from the plate parallel to the incident ray, but displaced by a distance $b$.

As Fig. 1 shows all necessary angle relations, the amount of this displacement $b$ can be calculated.

$\alpha$ is the angle between the incident light ray and the perpendicular to the surface of the glass plate.

$\beta$ is the angle between the incident light ray and the refracted light ray in the glass plate.

$z$ is the path of the light ray within the glass.

$b$ is the amount of the vertical displacement between incident and emerging light rays.

$n$ is the index of refraction of the glass.

$$b = z \times \sin(\alpha - \beta) \cdot \frac{D}{\cos \beta} = z, \quad b = \frac{D \cdot \sin(\alpha - \beta)}{\cos \beta},$$

$$D = \frac{b \cdot \cos \beta}{\sin(\alpha - \beta)} \cdot b = 0.09139$$

The amount of the vertical displacement $b$ is a function of angle of incidence $\alpha$ and the index of refraction of the glass.

Fig. 2 shows a diagram of this function for the index of refraction of 1.516. The displacement depends, of course, upon the thickness of the plate. In the diagram shown the plate has the thickness of the unit of length.

The function shown is a flat curve having a linear portion up to the angle of 15°. Therefore the extent of the displacement increases proportionally between 0 and 15°.

Therefore a uniformly rotating plane-parallel plate causes a uniform displacement of the light ray as long as a tilting angle of 15° is not exceeded.

Applying this condition to a rotating glass prism means that after the prism has been rotated 15°, the succeeding image must be projected so that the necessary number of prism faces can be calculated.

$$360 : 2 \times 15 = 12$$

A polygonal prism of 12 faces therefore allows a linear displacement. Now the necessary thickness of the prism can be calculated. A rotation of the prism by 15° corresponds with the displacement of half an image, which is 3.81 mm. in the case 16 millimeter is used $$D : d = B : b$$

$B = 3.81$ \qquad $b = 0.0913$
$D = x$ \qquad $d = 1$

In the following discussion of the optical conditions the influence of the lens on the light rays has not been considered. The differences caused by the fact that the lens does not give strictly parallel rays, are relatively so small that they may be neglected if a lens with long focal length is used.

The projection of film frames shows two extreme positions of the prism. The position shown in Fig. 3 does not result in any particular effect. In Fig. 4 two edges of the prism are located on the optical axis. The image seen looking through the prism, called below visible image, is formed by two halves of two succeeding film frames.

The upper half of the visible image is formed by the upper part of the lower frame while the lower half is formed by the lower part of the upper frame. In this position of the prism the extreme angle of 15° is exactly achieved but not exceeded and the visible image is free from astigmatism.

Conditions become more unfavourable with further tilting of the prism. Fig. 5 shows such unfavourable position of the prism. The visible image is composed of a major portion of the upper film frame and a minor portion of the lower film frame. The position of the prism faces now below the optical axis corresponds here with the unfavourable unlinear section of the curve of diagram Fig. 2. The larger part of the visible image is of good definition because it corresponds with the linear section of the curve. The other part formed by the lower frame shows astigmatic distortions which increase with the further tilting of the prism until the upper frame enters in the position shown in Fig. 3.

The effect caused by exceeding the angle of 15° appears as varying astigmatism. To reduce this effect it would be useful to utilize a prism with 24, at least with 16, faces. But its dimensions would be larger.

During the passage of the film frame from one position to the next one two positions exist without defects caused by tilting of the prism, namely positions according to Fig. 3 and Fig. 4. Immediately before reaching the position as in Fig. 3 the upper part of the visible image shows astigmatic distortions. These errors can be reduced by blacking out the edges of the prism in order to render them inactive for the moment of their unfavourable position shown in Fig. 5, but a flicker effect is often the consequence.

Fig. 5 shows another phenomenon. The circumferential speed of the rotating prism is higher than the speed of the film. By using glass with a higher index of refraction the diameter of the prism would be reduced and therefore its circumferential speed. A certain index of refraction would nearly equalize the circumferential speed of the rotating prism and the speed of the film and thereby minimize defects caused by the different speeds.

Fig. 6 is a side elevation of a motion picture projector embodying my invention. As shown the assembling board 2 carrying substantially all important parts of the projector is secured to support 1. This assembling board may be tilted by turning hand wheel 3. As further shown light from a source 5 in the lamphouse 4 is collected by the usual condenser lens 6 and concentrated on the film 15 in the exposure aperture 7. This film 15 moves continuously with uniform speed past this substantially stationary aperture. A compensating prism 9 is mounted between aperture 7 and the projecting lens 8. This prism has a plurality of plane parallel faces intersecting each other in substantially parallel prism edges and is rotatable around a substantially stationary axis intersecting the optical axis of the projector. The means for rotating the prism include a first gear 10 mounted on the same shaft with the prism 9. This gear 10 is meshing with a second gear 11. This second gear 11 is mounted on a common shaft with a sprocket wheel 12. This sprocket wheel 12 is engaging with and driven by the film 15. Sprocket wheel 13 is driven by the motor while sprocket wheel 12 is driven only by the film. This means that the film being driven by the sprocket wheel 13, drives i. e. rotates sprocket wheel 12 and this sprocket wheel 12 rotates by means of gears 11 and 10 the refraction prism 9. Thus no direct connection between the refraction prism and the motor exists; the prism 9 as well as the film moving past the film gate 7 are driven by sprocket 13 i. e. the film moves and rotates the prism 9. In accordance with my invention an idler roller 17 is arranged between the exposure aperture 7 and the sprocket wheel 12: this roller guiding the film between aperture and sprocket is adjustable in a direction normal to its axis of rotation. It serves thereby as adjusting means adapted to vary the length of film between the aperture and the sprocket wheel without changing the relative position between the gears 10 and 11. By variation of the film length between the aperture and the sprocket adjusting of the relative position of the film moving past the aperture and the prism is possible. Thus this adjusting roller is adapted for compensating of variations in film length by shrinkage of the film, as well as for framing of the picture in the aperture.

Fig. 7 shows a modification of the adjusting means shown in Fig. 1. In this embodiment of my invention the board 2 carries the ball bearings 18 for the shaft 19 of the prism 9 and the ball bearing 20 for shaft 21 of sprocket wheel 12. The relative position between said sprocket 12 and the gear 11 which is in mesh with the gear 10 can be changed by releasing and adjusting of nut 22. This arrangement enabling adjustment of gear 11 with respect to sprocket 12 makes the use of the adjustable roller 17 shown in Fig. 6 unnecessary; sometimes, however, it may be useful to provide for both arrangements.

Although Figs. 5 and 6 show two specific embodiments of my invention I want to point out that the adjustment proposed by me may be carried out also in other ways without departing from the spirit of my invention: Thus it is not necessary to provide for driving the prism gearing means: any other type of transmission members may be used as long as one of said transmission members is driven by the film and one of them drives the prism, provided that the relative angular position of at least a pair of cooperating transmission members is adjustable. This may not only be achieved by the means shown above but also by arranging two of the transmission members on the same shaft in such a way as to permit turning of one member with respect to the other and locking them in the required relative angular position.

As proposed above also gears may be used as transmission members: In this case it is either possible to arrange a gear turnable and adjustable on a common shaft with the sprocket, as shown in Fig. 7, or it is also possible to connect gear 10 and prism 9 or gear 11 and sprocket 12 by an adjustable coupling. It is furthermore possible to provide as adjusting means an arrangement in which no coupling means or the like are provided between the prism or the sprocket wheel and one of the gears, but the shaft carrying sprocket 12 and gear 11 is rotatably supported by adjusting means, these adjusting means slidably mounted on a curved guide concentric with the prism 9 or gear 10.

Fig. 8 shows diagrammatically an arrangement in which a transparent cylinder 23 is used as picture carrier. In the middle of this cylinder 23 a light source 24 and the reflecting mirror 25 are arranged. The light rays emitted by light source 24 pass through the exposure aperture 26, the picture carrying cylinder 23, prism 28 and projecting lens 30. The cylindrical picture carrier 23 and the prism 28 are rotatable around parallel axes of rotation. Furthermore means for rotating the prism 28 are provided for, said prism rotating means including a first gear 27 mounted coaxially with and driving the prism 28, a second gear 29 meshing with the first gear 27, this second gear mounted coaxially with and driven by the cylindrical film carrier 23. The relative position of this cylindrical film carrier 23 and gear 29 is adjustable, e. g. by not shown coupling means cooperating with gear 29.

Figs. 9 and 10 show a projecting arrangement in which on the picture carrier 31 a picture sequence is arranged in a straight line. The light beam from the light source 32 passes through this picture carrier 31 and refracting prism 34 and projection lens 33. This prism 34 is driven by rotating means including a gear 35 fixed on a common shaft with prism 34; this gear 35 is meshing with a toothed rack 36 slidably connected with the picture carrier 31. The relative position of said rack 36 and the picture carrier 31 can be adjusted by screws 37 and 38, locking thereby the rack and picture carrier in the required relative position.

I want to point out that in the embodiments of my invention shown in Figs. 8-9, using cylindrical or straight picture carriers, I may also use the most different adjusting means as described above in connection with projectors of the usual type: coupling means may be provided for between each pair of cooperating transmission members e. g. toothed rack and picture carrier, or between gear and prism; so long as these coupling means are adapted to adjust the relative position of two cooperating members of the transmission system for rotating the prism, they are intended to be covered by my present invention.

Fig. 11 shows a diagrammatic view of curved film guiding means provided with an exposure aperture. As shown in this figure the curvature of this film guiding means, e. g. film gate may be adjusted in order to enable adjustment of the exposure aperture and compensation for variations in film size. By varying the curvature the width of the picture normal to the direction of the light rays may be held constant:

If the film guiding means for unshrunken film have the curvature 41, they have for shrunken film material the decreased curvature 40. It is easily understood that thus the width of the light beam reaching the prism 39 may be held constant.

Fig. 12 shows a practical embodiment of this element of my invention. The guiding means consist of two guiding members 42 and 43, an exposure aperture formed by said members, hinge like means 44 turnably connecting said members and means for adjusting these film guiding means by turning into the required position. These adjusting means consist of two guiding rods 46 excentrically connected to the guiding plate 47 mounted on shaft 52. By turning knob 49 mounted also on shaft 52, rods 46 and guiding members 42, 43 are moved and the exposure aperture is adjusted. Rigidly connected with knob 49 is pointer 50, indicating on scale 51 the position of the guiding members 42, 43 and thereby enabling a continuous control of the adjustment of the exposure aperture.

These aperture adjusting means are especially useful in combination with the means for adjusting the relative position of the prism and the film passing the aperture: using these means in combination as proposed it is possible to eliminate practically all optical errors caused by the refracting prism.

In projectors using two compensating prisms arranged upon opposite sides of the projection lens, it is of special importance to provide adjusting means in accordance with my invention as it is very difficult to maintain the needed constant relation between the picture in the exposure aperture and each of these prisms. Therefore I propose to drive the means rotating these prisms by the film itself and to provide means for adjusting the relative position of the film moving past said aperture and each of said prisms; as adjusting means any of the devices proposed by me and described above may be used.

It will also be understood that each of the elements above described, or two or more together, may also find a useful application in other types of projectors with optical compensation differing from the types above described.

While I have illustrated and described my invention as embodied in motion picture projector, I do not intend to be limited to the details shown since various modifications and structural changes may be made without in any way departing from the spirit of my invention, the scope of which is pointed out in the appended claims.

What I claim is:

1. In a cinematographic projector a curved film gate, means for moving a film continuously with uniform speed past said film gate, a rectifying prism having a plurality of pairs of plane-parallel faces, a shaft carrying said prism, a gear carried by said shaft, a second gear being in mesh with said first gear, a second shaft carrying said second gear, a sprocket wheel on said second shaft, an idler roller between said curved gate and said sprocket wheel, said idler roller being adjustable in a direction normal to its axis of rotation, and a second sprocket wheel, and means being adapted to drive said second sprocket wheel independently from said first sprocket wheel as long as no film connection exists between them.

2. In a cinematographic projector a curved film gate, means for moving a film continuously with uniform speed past said film gate, a rectifying prism having a plurality of plane-parallel faces, said prism being fixed on a shaft normal to the optical axis of said projector, a gear carried by said shaft, a second gear meshing with said first gear, a second shaft carrying said second gear and being parallel to said first shaft, a sprocket wheel on said second shaft, an idler roller between said curved gate and said sprocket, said idler roller being adjustable in a direction normal to its axis of rotation, a second sprocket wheel, and means being adapted to drive said second sprocket wheel independently from and without any influence on said first sprocket wheel as long as no film connection exists.

3. In a cinematographic projector a picture film comprising a series of pictures and dividing lines between said pictures, a film gate, means for moving said film continuously with uniform speed past said film gate, a rectifying prism having a plurality of pairs of plane-parallel faces, said prism being rotatable around an axis normal to the optical axis of said projector, a gear carried by a shaft carrying the prism too, a second gear meshing with said first gear, a second shaft carrying said second gear, a sprocket wheel on said second shaft, another sprocket wheel, means to drive said second sprocket wheel independently from said first sprocket wheel, said film engaging with both sprocket wheels, thereby transmitting the movement from the second to the first sprocket wheel and driving the film, an idler roller between said gate and said first sprocket wheel, said idler roller being adjustable to compensate for alteration of the film length and to adjust the relative position of said picture dividing lines and the intersection lines of said prism faces.

4. In a cinematographic projector a curved film gate, a light source for projecting a film through said film gate, a rectifying prism having a plurality of pairs of plane-parallel faces in front of said film gate, an idler sprocket engaging said film after the same has passed said film gate, said idler sprocket being rotated by said film and being connected with said prism so as to rotate the same while the film is moving, an idler roller between said curved gate and said idler sprocket, said idler roller being adjustable in a direction normal to its axis of rotation, and a driving sprocket engaging said film after the same has passed said idler sprocket, and means for rotating said driving sprocket only.

FRANZ F. EHRENHAFT.